Aug. 15, 1933.    J. W. ANDERSON    1,922,343
PORTABLE STEAM GENERATOR
Filed July 9, 1931
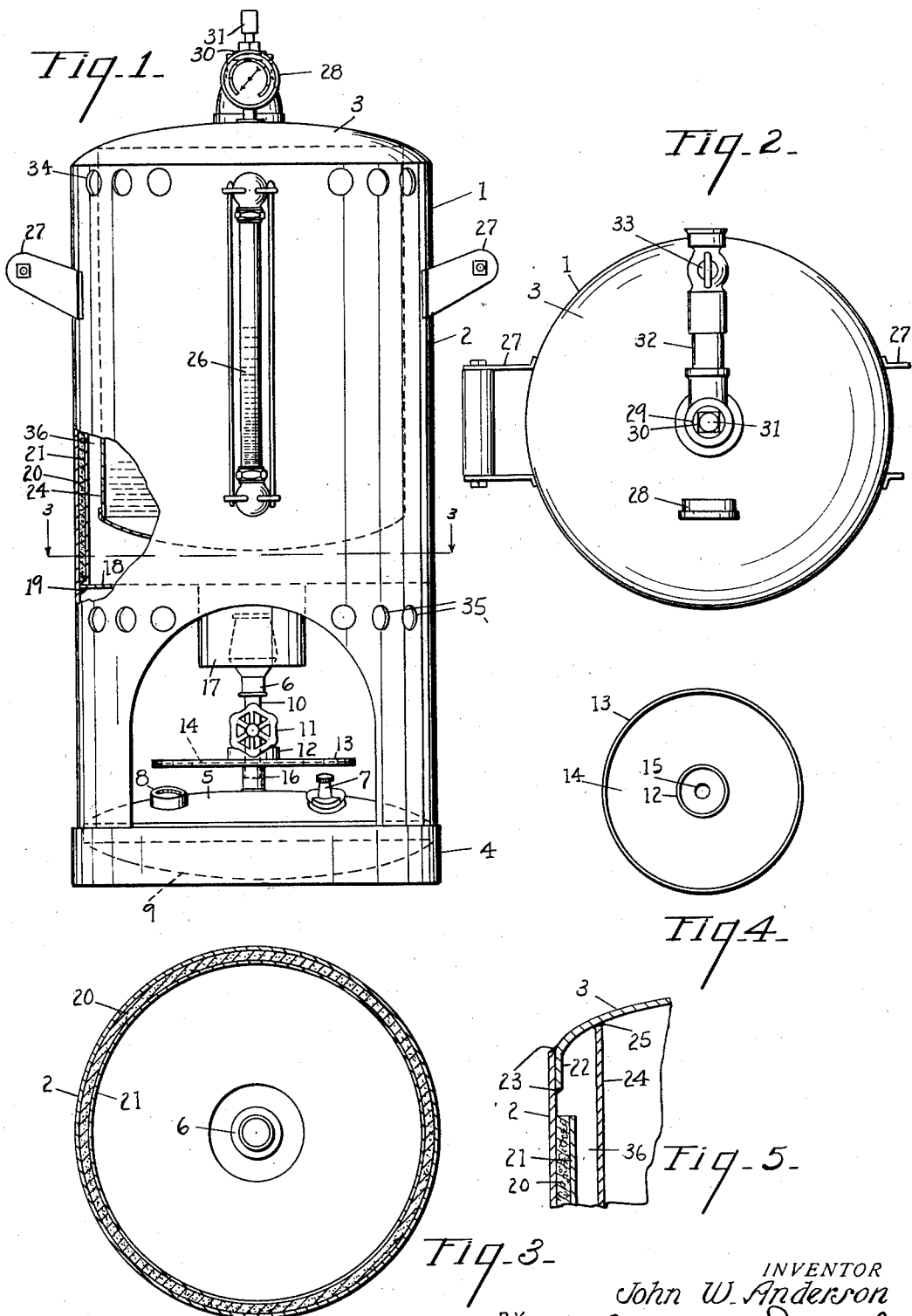

Patented Aug. 15, 1933

1,922,343

UNITED STATES PATENT OFFICE 1,922,343

PORTABLE STEAM GENERATOR

John W. Anderson, South Bend, Ind., assignor to General Sheet Metal Works, Inc., South Bend, Ind.

Application July 9, 1931. Serial No. 549,717

4 Claims. (Cl. 122—23)

The main object of the invention is to provide a portable steam generator for wall paper removing and the like which is relatively simple to operate, economical to manufacture and efficient in operation.

Further objects of the invention will be apparent from the specification and drawing, in which Fig. 1 is a front elevation partially broken away of a portable steam generator constructed in accordance with my invention.

Fig. 2 is a top plan view of the portable steam generator illustrated in Fig. 1.

Fig. 3 is a horizontal section taken on line 3—3 of Fig. 1.

Fig. 4 is a top plan view of the priming cup and shield of the burner, and

Fig. 5 is a fragmentary view in vertical section of the upper part of the structure.

Referring to the drawing, the portable steam generator 1 comprises a cylindrical casing 2 having a dome-shaped top 3 and a re-inforcing base ring 4. A stove 5 having a burner 6 is mounted in the bottom of the casing 2. The stove is provided with a pump 7 and a pressure gauge 8 mounted on the reservoir 9 thereof.

A central vertical stem 10 supports the burner 6, the supply of fuel through the stem 10 being regulated by a valve 11. The stem 10 carries a horizontal priming cup 12 and a combined drip pan and heat shield 13 in spaced relation to the top of the reservoir 9. As shown by Fig. 4, the bottom 14 of the combined drip pan and heat shield 13 also constitutes the bottom of the priming cup 12, said bottom having a central opening 15 for the passage of the stem 10.

A collar 16 embraces the lower end of the stem under the bottom of the shield 14 for supporting the latter on the top of the reservoir 9. The collar 16 is preferably welded to the stem 10, the heat shield 13 and the top of the reservoir 9.

The burner 6 is surrounded by a concentric chimney 17 spaced therefrom having an outwardly extending horizontal supporting flange 18, the periphery of which is secured to the inside of the outer casing 2 by welding at 19. A cylindrical body of heat insulating material 20 is disposed on the inside of the outer casing 2 in the space above the horizontal flange 18. This heat insulating material is held in place by an inner wall or lining 21 which surrounds the inside thereof and is concentric with the wall of the casing 2.

The dome-shaped top 3 is provided with a vertical annular flange 22 over which is telescoped the upper end of the outer casing 2 as shown in detail by Fig. 5. The edges of the annular flange 22 and the casing 2 are connected by welding at 23.

A boiler drum or reservoir 24 has its upper edge connected by welding at 25 to the cover 3 and depends downwardly into the outer casing 2 in spaced relation to the inner wall thereof and the horizontal flange 18 of the chimney. The top 3 of the casing 2 also constitutes the top for the boiler 24.

A water level indicator 26 is mounted on the outside of the casing 2 for indicating the level of the water inside of the boiler 24.

Handles 27 are mounted on the casing near the top thereof so that the device is readily portable.

A pressure gage 28 is mounted on the top 3 for indicating the steam pressure within the boiler 24.

The top 3 is provided with a central opening 29 having a nipple 30 mounted therein. The nipple 30 is provided with a safety popoff 31 in the top thereof and a short conduit 32 connected to the side thereof. A valve 33 is connected to the short conduit 32 for controlling the passage of steam therethrough. The outer end of the valve 33 is adapted to be connected to a hose leading to any desirable apparatus with which steam is to be used such as an applicator for directing the steam onto the wall paper which is to be removed from a wall.

The casing 2 is provided with a plurality of perforations or holes 34 near the top edge thereof and a plurality of similar perforations or holes 35 just under the horizontal flange 18 of the chimney 17. The holes 35 keep the burner 6 supplied with fresh air while the holes 34 cause the heat generated by the burner 6 to circulate under the boiler 24 and then to pass upwardly through the space 36 between the boiler and the casing wall 21. This results in a highly efficient operation of the device because practically all of the heat generated by the burner 6 is utilized in heating the boiler 24.

While I have illustrated and described a preferred embodiment of the invention, it is to be understood that various changes may be made therein and other embodiments may be adapted therefrom without departing from the spirit of the invention which is to be limited only by the prior art and the scope of the following claims.

Having thus described my invention, what I claim as new and desire to secure by Letters Patent, is:

1. A device of the character described, comprising a vertical cylindrical outer casing, a stove having opposed upper and lower dome-shaped walls and vertical cylindrical side walls telescoped in the lower end of said casing and secured thereto, a vertical cylindrical reinforcing base ring embracing the lower end of said casing and secured thereto, a vertical cylindrical chimney having a horizontal annular supporting flange extending to said casing and secured thereto, a vertical cylindrical inner casing having a horizontal annular end flange at its lower end extending to said outer casing, the top of said inner casing being spaced below the top of said outer casing with the bottom resting on said chimney flange, insulation disposed in the space between said inner and outer casings, a dome-shaped top for said outer casing having a central outlet and a vertical cylindrical flange telescoped in the upper end of said outer casing and secured thereto, the bottom of said top flange being spaced from the top of said inner casing, said outer casing having a series of ventilating openings between said top flange and inner casing, and a vertical cylindrical boiler depending from said top in concentric spaced relation to said inner casing and terminating above said chimney flange.

2. A device of the character described, comprising a vertical cylindrical outer casing, a stove having vertical cylindrical side walls telescoped in the lower end of said casing and secured thereto, a vertical cylindrical reinforcing base ring embracing the lower end of said casing and secured thereto, a vertical cylindrical chimney having a horizontal annular supporting flange extending to said casing and secured thereto, a vertical cylindrical inner casing having a horizontal annular end flange at its lower end extending to said outer casing, the top of said inner casing being spaced below the top of said outer casing with the bottom resting on said chimney flange, insulation disposed in the space between said inner and outer casings, a top for said outer casing having a vertical cylindrical flange telescoped in the upper end of said outer casing and secured thereto, the bottom of said top flange being spaced from the top of said inner casing, said outer casing having a series of ventilating openings between said top flange and inner casing, and a vertical cylindrical boiler depending from said top in concentric spaced relation to said inner casing and terminating above said chimney flange.

3. A device of the character described, comprising a vertical cylindrical outer casing, a vertical cylindrical chimney having a horizontal annular supporting flange extending to said casing and secured thereto, a vertical cylindrical inner casing having a horizontal annular end flange at its lower end extending to said outer casing, the top of said inner casing being spaced below the top of said outer casing with the bottom resting on said chimney flange, insulation disposed in the space between said inner and outer casings, a top for said outer casing having a vertical cylindrical flange telescoped in the upper end of said outer casing and secured thereto, and a vertical cylindrical boiler depending from said top in concentric spaced relation to said inner casing and terminating above said chimney flange.

4. A device of the character described, comprising an outer casing, a chimney having a supporting flange extending to said casing and secured thereto, an inner casing having an end flange at its lower end extending to said outer casing, the top of the inner casing being spaced below the top of the outer casing with the bottom resting on said chimney flange, insulation disposed in the space between said inner and outer casings, and a top for said outer casing having a flange telescoped in the upper end of said outer casing and secured thereto.

JOHN W. ANDERSON.